(12) United States Patent  
Ma

(10) Patent No.: US 8,751,719 B2
(45) Date of Patent: Jun. 10, 2014

(54) DEVICE AND METHOD FOR ENHANCING FLEXIBILITY OF INTERFACE BETWEEN 3G COMMUNICATION MODULE AND APPLICATION PROCESSOR

(75) Inventor: Liang Ma, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/521,327

(22) PCT Filed: Aug. 19, 2010

(86) PCT No.: PCT/CN2010/076159
§ 371 (c)(1),
(2), (4) Date: Oct. 17, 2012

(87) PCT Pub. No.: WO2011/116582
PCT Pub. Date: Sep. 29, 2011

(65) Prior Publication Data
US 2013/0036245 A1 Feb. 7, 2013

(30) Foreign Application Priority Data
Mar. 25, 2010 (CN) .......................... 2010 1 0131859

(51) Int. Cl.
*G06F 13/00* (2006.01)
(52) U.S. Cl.
USPC .................. 710/305; 370/310; 455/550.1
(58) Field of Classification Search
USPC ............... 710/315, 305; 370/310; 455/550.1, 455/552.1
See application file for complete search history.

(56) References Cited

U.S. PATENT DOCUMENTS 6,795,877 B2 * 9/2004 Glenn .............................. 710/36
2003/0179724 A1 9/2003 Seo
2005/0066074 A1 3/2005 Suh et al.
2007/0255973 A1 * 11/2007 Nakagawa et al. ............ 713/502
2009/0210691 A1 8/2009 Im et al.
2010/0216506 A1 * 8/2010 Chang et al. ............... 455/552.1

FOREIGN PATENT DOCUMENTS

CN 1588301 3/2005
CN 1758232 4/2006
WO WO 01/91296 A2 11/2001

OTHER PUBLICATIONS

International Search Report for International Application No. PCT/CN2010/076159 mailed Dec. 23, 2010.
Supplementary European Search Report for European Application No. 10848244.9, dated Jul. 23, 2013.

* cited by examiner

*Primary Examiner* — Glenn A Auve
(74) *Attorney, Agent, or Firm* — Pearl Cohen Zedek Latzer Baratz LLP

(57) ABSTRACT

This invention provides a device and method for enhancing flexibility of interface between 3G communication module and application processor. The device comprises the 3G communication module, the AP and an interface transfer module connected between them, wherein the interface transfer module is configured to perform bus transfer. A bus interface of the 3G communication module adapted to voice service data and a bus interface of the AP adapted to voice service data are directly connected. The bus transfer in the present invention is: the interface transfer module converts the bus data format of the non-voice service data adapted to the 3G communication module or the AP into the bus data format of the non-voice service data adapted to the AP or the 3G communication module. With this invention, the 3G communication module can be connected with various APs conveniently, and the generality of the 3G communication module is improved.

16 Claims, 3 Drawing Sheets

DEVICE AND METHOD FOR ENHANCING FLEXIBILITY OF INTERFACE BETWEEN 3G COMMUNICATION MODULE AND APPLICATION PROCESSOR

CROSS-REFERENCE TO RELATED APPLICATIONS

This application is a National Phase Application of PCT International Application No. PCT/CN2010/076159, International Filing Date Aug. 19, 2010, claiming priority of Chinese Patent Application No. 201010131859, filed Mar. 25, 2012, which is hereby incorporated by reference.

FIELD OF THE INVENTION

The present invention relates to the field of 3G communication module equipment interface, and in particular to a device and method for enhancing flexibility of an interface between a 3G communication module and an application processor.

BACKGROUND OF THE INVENTION

The 3G communication modules described below can realize: receiving and sending a 3G signal, converting the 3G signal into data of voice service or data service, and then sending it to an Application Processor (AP) through a certain interface.

At present, the application of the 3G communication module still belongs to a developing technical field, and there is no standard for the interfaces between 3G communication modules and the APs. Most 3G communication modules keep using the connection mode between a data card and a computer, and use a USB interface for connection. In the operating system of the AP, a port for the virtual voice service and the data service is used for realizing interaction between voice and data. Such connection mode has a problem that the USB interface is not adapted to be applied in equipments with low power consumption, such as a mobile terminal, due to its high power consumption. In order to solve the problem of high power consumption of the USB interface, some 3G communication modules use a Pulse Code Modulation (PCM) interface to transmit voice service data and a Universal Asynchronous Receiver/Transmitter (UART) interface to transmit data with a small volume. Only in a case of a relatively large data volume, a high-speed USB interface is used. One to four General Purpose Input Output (GPIO) interfaces is used for the wakeup between the 3G communication module and the AP.

As the development of the Internet of things depends on the fixed network and the mobile network, the efforts of telecom operators in China in the research and development of the Internet of things will further accelerate the development of the Chinese industry of the Internet of things. With the rapid development of the Internet of things, 3G communication modules will be widely applied in various radio communication fields. Therefore, the APs connected with 3G communication modules will also be more diversified. An AP in a traditional smart phone or netbook has many interfaces, such as USB, PCM, Inter-Integrated Circuit (I2C) and UART. While in industrial or simple civilian radio communication fields, some APs are applied in an application environment relying mainly on programmable logic controller (PLC) or simple single chip machine. These APs do not have abundant interfaces to connect with 3G communication modules, therefore connection between 3G communication modules and APs is limited.

SUMMARY OF THE INVENTION

Therefore, one objective of the present invention is to provide a device for enhancing flexibility of an interface between a 3G communication module and an application processor, so as to solve the problem in the existing 3G communication module and AP interface technology that the connection is limited because the 3G communication module interface is simplex, and particularly because there is only one kind of interface, the USB interface, serving as the network data service transmission interface to be connected with the AP.

Another objective of the present invention is to provide a method for enhancing flexibility of an interface between a 3G communication module and an application processor, so as to solve the problem that the connection between 3G communication modules and APs is limited in the related art.

In order to solve the above technical problems, the technical solution of the present invention is realized as follows.

A device for enhancing flexibility of an interface between a 3G communication module and an application processor comprises: the 3G communication module and the application processor AP, further comprises:

an interface transfer module, connected between the 3G communication module and the AP, and configured to perform bus transfer for a bus interface of the 3G communication module adapted to non-voice service data and a bus interface of the AP adapted to non-voice service data; and a bus interface of the 3G communication module adapted to voice service data and a bus interface of the AP adapted to voice service data being directly connected.

The bus transfer is that: the interface transfer module converts the bus data format of the non-voice service data adapted to the 3G communication module into the bus data format of the non-voice service data adapted to the AP, and/or converts the bus data format of the non-voice service data adapted to the AP into the bus data format of the non-voice service data adapted to the 3G communication module.

The interface transfer module is a Field-Programmable Gate Array (FPGA), wherein the FPGA is connected with the 3G communication module through an ADM (address-data multiplexed) bus and connected with the AP through a Serial Peripheral Interface (SPI) bus.

The FPGA caches the non-voice service data written by the 3G communication module through the ADM bus in a cache pool, so that the non-voice service data is read by the AP through the SPI bus; or, caches the non-voice service data written by the AP through the SPI bus in a cache pool, so that the non-voice service data is read by the 3G communication module through the ADM bus.

The 3G communication module has two wakeup interfaces (GPIO1 and GPIO2) connected with the AP and configured to write the non-voice service data of the 3G communication module into the AP, when one wakeup interface (GPIO1) is set to be high level, write the non-voice service data of the 3G communication module into the cache pool of the FPGA, and when the other wakeup interface (GPIO2) is set to be high level, notify the AP to read the non-voice service data of the 3G communication module from the cache pool of the FPGA;

the AP has two wakeup interfaces (GPIO3 and GPIO4) connected with the 3G communication module and configured to write the non-voice service data of the AP into the 3G communication module, when one wakeup interface (GPIO3) is set to be high level, write the non-voice service data of the AP into the cache pool of the FPGA, and when the other wakeup interface (GPIO4) is set to be high level, notify the 3G communication module to read the non-voice service data of the AP from the cache pool of the FPGA.

A method for enhancing flexibility of an interface between a 3G communication module and an application processor, used for writing and reading of voice service data and non-voice service data of the 3G communication module and the AP, and comprising steps of:

an interface transfer module connected between the 3G communication module and the AP performing bus transfer for a bus interface of the 3G communication module adapted to the non-voice service data and a bus interface of the AP adapted to the non-voice service data; and the voice service data of the 3G communication module or the AP being transmitted through a bus directly connecting the 3G communication module and the AP.

The bus transfer is that: the interface transfer module converts the bus data format of the non-voice service data adapted to the 3G communication module into the bus data format of the non-voice service data adapted to the AP, and/or converts the bus data format of the non-voice service data adapted to the AP into the bus data format of the non-voice service data adapted to the 3G communication module.

The interface transfer module is an FPGA, wherein the FPGA is connected with the 3G communication module through an ADM bus and connected with the AP through an SPI bus.

Writing and reading of the non-voice service data comprise: the FPGA caching the non-voice service data written by the 3G communication module through the ADM bus in a cache pool, so that the non-voice service data is read by the AP through the SPI bus; or caching the non-voice service data written by the AP through the SPI bus in a cache pool, so that the non-voice service data is read by the 3G communication module through the ADM bus.

Writing and reading of the non-voice service data comprise:

the 3G communication module having two wakeup interfaces (GPIO1 and GPIO2) connected with the AP and configured to write the non-voice service data of the 3G communication module into the AP, when one wakeup interface (GPIO1) is set to be high level, writing the non-voice service data of the 3G communication module into the cache pool of the FPGA, and when the other wakeup interface (GPIO2) is set to be high level, notifying the AP to read the non-voice service data of the 3G communication module from the cache pool of the FPGA; and the AP having two wakeup interfaces (GPIO3 and GPIO4) connected with the 3G communication module and configured to write the non-voice service data of the AP into the 3G communication module, when one wakeup interface (GPIO3) is set to be high level, writing the non-voice service data of the AP into the cache pool of the FPGA, and when the other wakeup interface (GPIO4) is set to be high level, notifying the 3G communication module to read the non-voice service data of the AP from the cache pool of the FPGA.

Compared with the related art, the main technical effect of the present invention is that: flexibility of designing an interface between a 3G communication module and an AP is enhanced. The 3G communication module is connected with an interface transfer module through an ADM bus, and the AP can realize connection with a corresponding interface by setting the interface transfer module according to the specific AP interface situation and application situation. In this way, the generality of the 3G communication module is improved, and the 3G communication module can be connected with various APs conveniently. In addition, the problem of high power consumption resulted from using a USB interface is avoided. It is unnecessary to supply power to the interface after the system enters the standby state, and the interface transfer module, for example the FPGA, has quite low power consumption in the standby state.

DETAILED DESCRIPTION OF THE EMBODIMENTS

The present invention will be described in detail below with reference to drawings.

Figure 1:
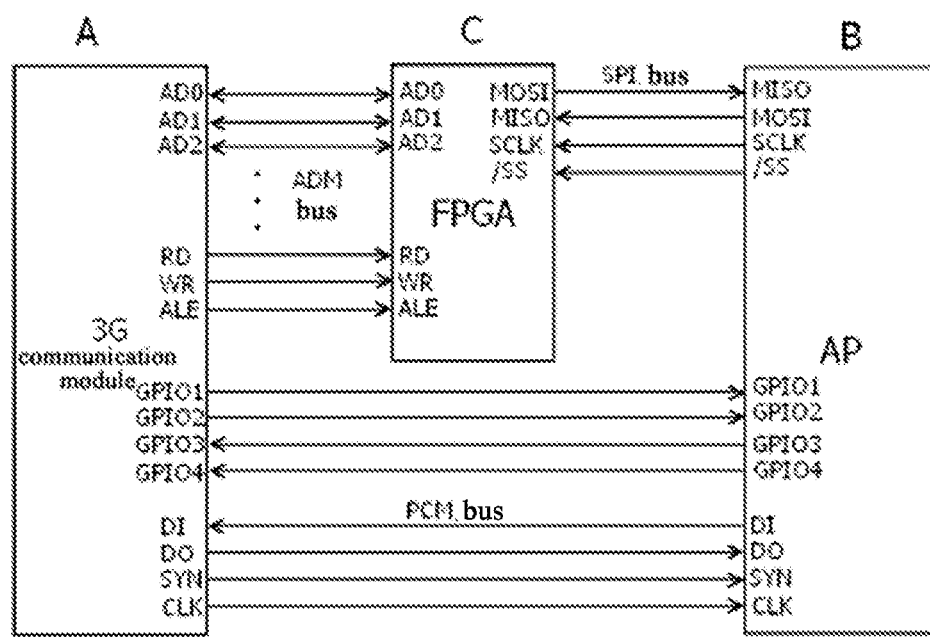
FIG. 1 is a diagram of a device for enhancing flexibility of an interface between a 3G communication module and an application processor according to the present invention.

FIG. 1 shows a device for enhancing flexibility of an interface between a 3G communication module and an application processor according to the present invention. The device comprises:

the 3G communication module, configured to receive a 3G RF signal, convert it to an usable data and then send it to the AP for processing, and convert an usable data from the AP into a 3G RF signal;

the AP, configured to control various peripheral equipments to realize specific applications, such as surfing the internet, making a call, or the like; and an interface transfer module, connected between the 3G communication module and the AP, and configured to perform bus transfer on a bus interface of the 3G communication module adapted to non-voice service data and a bus interface of the AP adapted to non-voice service data;

wherein the bus interface of the 3G communication module adapted to voice service data and the bus interface of the AP adapted to voice service data are directly connected.

The above-described bus transfer is that: the interface transfer module converts the bus data format of the non-voice service data adapted to the 3G communication module into the bus data format of the non-voice service data adapted to the AP, and/or converts the bus data format of the non-voice service data adapted to the AP into the bus data format of the non-voice service data adapted to the 3G communication module.

The interface transfer module according to the present invention may be an FPGA or a programmable microprocessor.

In the specific example shown in FIG. 1, the bus interface of the 3G communication module adapted to non-voice service data comprises ports AD0, AD1, AD2, RD, WR, and ALE, etc., as shown in FIG. 1. They are connected with the corresponding ports of the FPGA through a parallel asynchronous (ADM) bus. The bus interface of the AP adapted to non-voice service data comprises ports MISO, MOSI, SCLK, and /SS etc., as shown in FIG. 1. They are connected with the corresponding ports of the FPGA through an SPI bus.

In addition, the bus interface of the 3G communication module adapted to voice service data and the bus interface of the AP adapted to voice service data are directly connected through the PCM bus. The 3G communication module and the AP mainly use the PCM bus for the voice service of the 3G communication module. That is, transmission of voice between the 3G communication module and the AP is completed through the PCM bus when the user makes a call.

Realizing mutual conversion of bus data needs the FPGA to cache and forward the bus data. Therefore the FPGA respectively caches in a cache pool the non-voice service data that the 3G communication module or the AP writes through the ADM bus or SPI bus, so that the non-voice service data can be read by the AP or the 3G communication module through the SPI bus or ADM bus.

In the specific case shown in FIG. 1, the 3G communication module writes the non-voice service data into the cache pool of the FPGA through the ADM bus. After the writing is completed, the 3G communication module notifies the AP to read from the cache pool of the FPGA the non-voice service data written by the 3G communication module. The AP writes the non-voice service data into the cache pool of the FPGA through the SPI bus. After the writing is completed, the AP notifies the 3G communication module to read from the cache pool of the FPGA the non-voice service data written by the AP.

In order to realize writing and reading of the non-voice service data, the 3G communication module is provided with (has) two wakeup interfaces, GPIO1 and GPIO2, connected with the AP and configured to write the non-voice service data of the 3G communication module into the AP. When one wakeup interface GPIO1 is set to be high level, the non-voice service data of the 3G communication module is written into the cache pool of the FPGA, and when the other wakeup interface GPIO2 is set to be high level, the AP is notified to read the non-voice service data of the 3G communication module from the cache pool of the FPGA.

The AP is also provided with (has) two wakeup interfaces, GPIO3, GPIO4, connected with the 3G communication module and configured to write the non-voice service data of the AP into the 3G communication module. When one wakeup interface GPIO3 is set to be high level, the non-voice service data of the AP is written into the cache pool of the FPGA, and when the other wakeup interface GPIO4 is set to be high level, the 3G communication module is notified to read the non-voice service data of the AP from the cache pool of the FPGA.

According to another aspect of the present invention, a method for enhancing flexibility of an interface between a 3G communication module and an application processor is further provided. The method is used for writing and reading voice service data and non-voice service data of the 3G communication module and the AP. The method comprises:

an interface transfer module connected between the 3G communication module and the AP performs bus transfer on a bus interface of the 3G communication module adapted to non-voice service data and a bus interface of the AP adapted to non-voice service data; and the voice service data of the 3G communication module or the AP is directly mutually transmitted.

The process of writing the non-voice service data of the 3G communication module and the AP into the FPGA, and the process of the AP and the 3G communication module reading the written non-voice service data from the FPGA are described below with reference to FIG. 2 and FIG. 3.

First, with reference to FIG. 1, each of the 3G communication module and the AP is provided with four GPIO interfaces which are mainly used for bidirectional wakeup and reading/writing control of the FPGA. In this case, the 3G communication module controls the state of interfaces GPIO1 and GPIO2, and the AP detects the state of the two GPIO interfaces and executes corresponding operations. Therefore, interfaces GPIO1 and GPIO2 are set as output ports in the 3G communication module, and they are set as input ports in the AP. The AP controls the state of interfaces GPIO3 and GPIO4, the 3G communication module detects the state of the two GPIO interfaces and executes corresponding operations. Therefore, interfaces GPIO3 and GPIO4 are set as output ports in the AP, and they are set as input ports in the 3G communication module.

Figure 2:
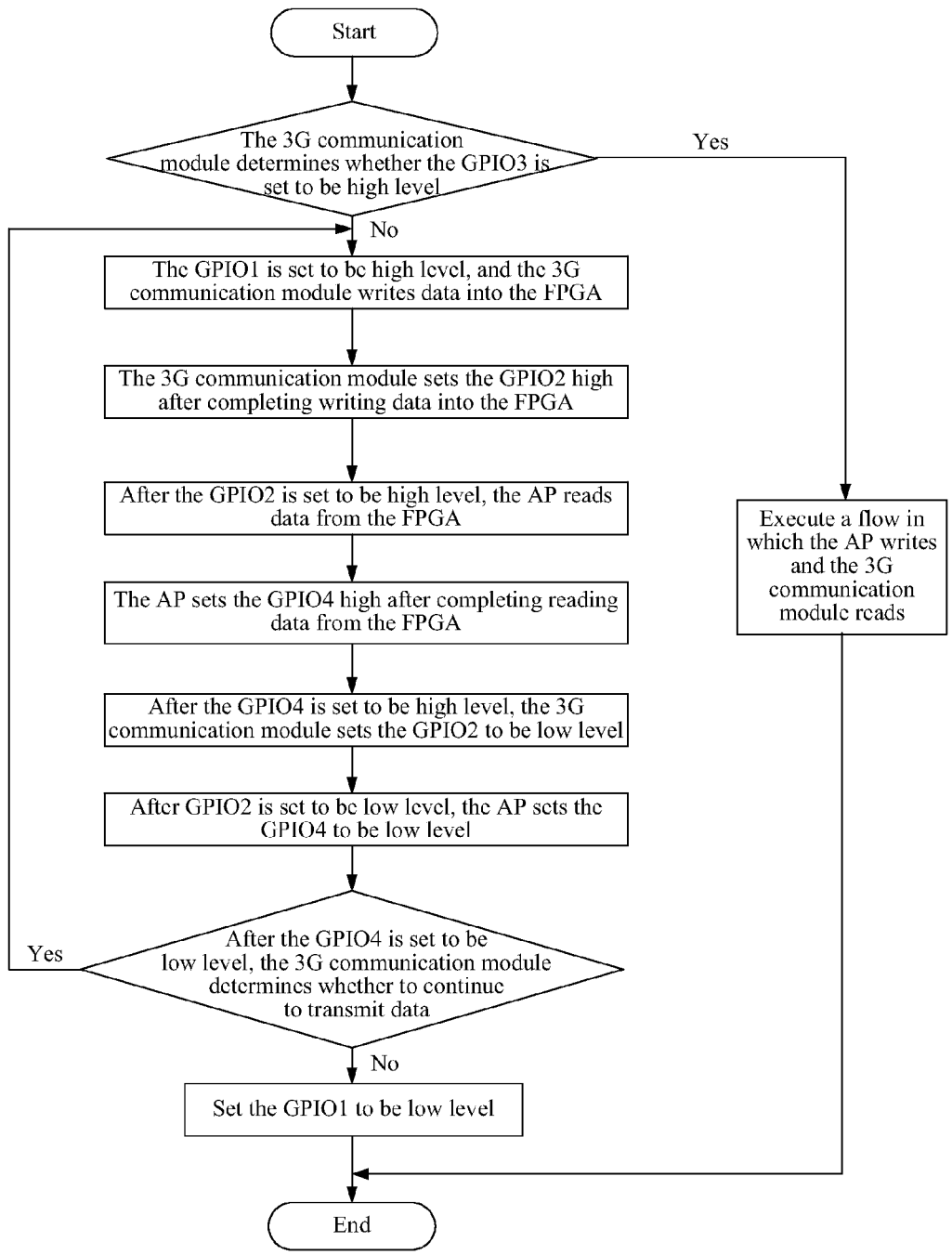
FIG. 2 is the diagram of a flow in which the 3G communication module writes the non-voice service data into the FPGA and the AP reads the non-voice service data from the FPGA according to the present invention.

FIG. 2 is the diagram of a flow in which the 3G communication module writes the non-voice service data into the FPGA and the AP reads the non-voice service data from the FPGA according to the present invention. As shown in FIG. 2, the flow of the 3G communication module writing and the AP reading comprises the following processing steps.

When the 3G communication module needs to write the non-voice service data, the 3G communication module first determines whether the GPIO3 is set to be high level. If the GPIO3 is set to be high level, it indicates that the AP is executing the writing flow. Then, a flow in which the AP writes and the 3G communication module reads is executed, and the 3G communication module waits for the AP completing the writing and sets the GPIO3 to be low level. If the GPIO3 is not set to be high level, the 3G communication module sets the GPIO1 to be high level, and writes the non-voice service data into the cache pool of the FPGA through the ADM bus. In this embodiment, the cache pool of the FPGA is set as having 10 kByte. After the data writing is completed, the GPIO2 is set to be high level. After detecting that the GPIO1 is set to be high level, the AP waits for the GPIO2 being set high level, then reads data of 10 kByte from the cache pool of the FPGA through the SPI bus after the GPIO2 is set to be high level, and sets the GPIO4 to be high level after the reading is completed. The 3G communication module sets the GPIO2 to be low level after detecting that the GPIO4 is set to be high level. And the AP sets the GPIO4 to be low level after detecting that the GPIO2 is set to be low level. After detecting that the GPIO4 is set to be low level, the 3G communication module determines whether there is any non-voice service data transmission, and sets the GPIO1 to be low level if data is completely transmitted and exits the flow; and continues to write the non-voice service data into the cache pool of the FPGA if data is not completely transmitted. The above flow is repeated until all the data are read.

Figure 3:
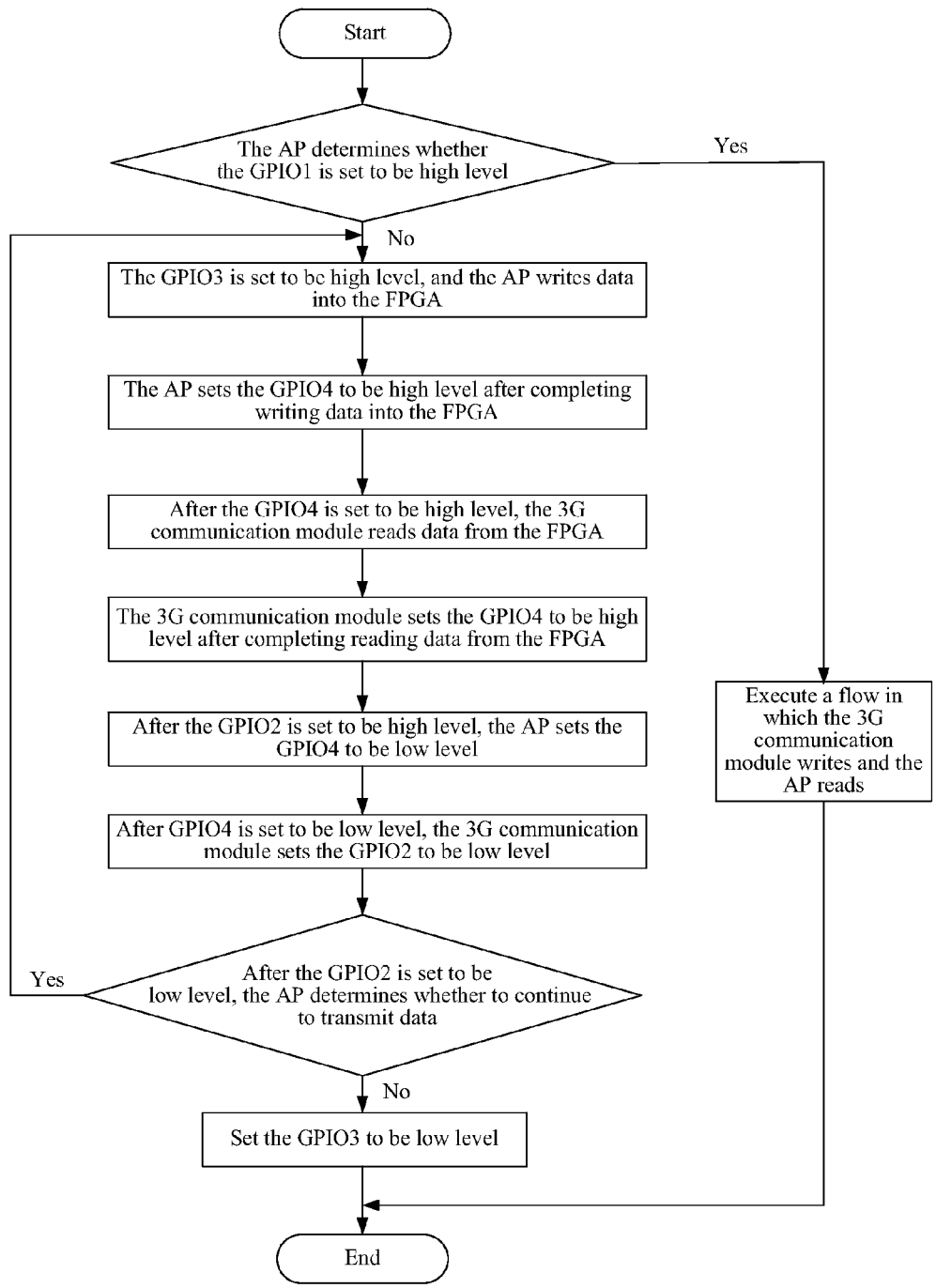
FIG. 3 is the diagram of a flow in which the AP writes the non-voice service data into the FPGA and the 3G communication module reads the non-voice service data from the FPGA according to the present invention.

FIG. 3 is the diagram of a flow in which the AP writes the non-voice service data into the FPGA and the 3G communication module reads the non-voice service data from the FPGA according to the present invention. As shown in FIG. 3, the flow in which the AP writes and the 3G communication module reads comprises the following processing steps.

The AP first determines whether the GPIO1 is set to be high level. If the GPIO1 is set to be high level, it indicates that the 3G communication module is executing the writing flow. Herein, a flow in which the 3G communication module writes and the AP reads is executed, and the AP waits for the 3G communication module completing the writing and sets the GPIO1 to be low level. If the GPIO1 is not set to be high level, the AP sets the GPIO3 to be high level, and writes the non-voice service data into the cache pool of the FPGA through the SPI bus. After the data writing is completed, the GPIO4 is set to be high level. The 3G communication module waits for the GPIO4 being set high level after detecting that the GPIO3 is set to be high level, and reads data of 10 kByte from the cache pool of the FPGA through the ADM bus after the GPIO4 is set to be high level, and sets the GPIO2 to be high level after the reading is completed. The AP sets the GPIO4 to be low level after detecting that the GPIO2 is set to be high level. And the 3G communication module sets the GPIO2 to be low level after detecting that the GPIO4 is set to be low level. After detecting that the GPIO2 is set to be low level, the AP determines whether there is any non-voice service data transmission, and sets the GPIO3 to be low level if data is completely transmitted and exits the flow; and continues to write the non-voice service data into the cache pool of the FPGA if data is not completely transmitted. The above flow is repeated until all the data are read.

Compared with the related art, the present invention has the following technical effects:

1. The flexibility of designing an interface between a 3G communication module and an AP is enhanced. The 3G communication module is connected with an interface transfer module through a 8-bit or 16-bit ADM bus. The AP may realize connection with a corresponding interface by setting the interface transfer module according to the specific AP interface situation and application situation. In this way, the generality of the 3G communication module is improved, and the 3G communication module can be connected with various APs conveniently.

2. Compared with the USB connection method in the related art, the power consumption is lowered, and particularly the standby power consumption is lowered. As determination and loading drives applied to equipment are required at each time when the USB interface is powered on, it takes a very long time to complete such a process. In addition, in order to quickly respond to the demands of services, in the related art it is necessary to continuously supply power to the USB interface after the system enters the standby state. However, according to the connection method in the present invention, it is unnecessary to supply power to the interface after the system enters the standby state, and the interface transfer module, for example the FPGA, has quite low power consumption in the standby state.

Although the present invention has been described in detail above, the present invention is not limited hereto. For those skilled in the art, various modifications can be made according to the principle of the present invention. Therefore, any modifications made according to the principle of the present invention should be included within the protection scope of the present invention.

What is claimed is:

1. A device for connecting a 3G communication module and an application processor (AP), comprising: the 3G communication module and the AP, wherein the device further comprises:
   an interface transfer module, connected between the 3G communication module and the AP, and configured to perform bus transfer on a bus interface of the 3G communication module adapted to non-voice service data and a bus interface of the AP adapted to non-voice service data, and
   a bus interface, which is used for transmitting voice service data, of the 3G communication module adapted to voice service data and a bus interface, which is used for transmitting voice service data, of the AP being directly connected.

2. The device according to claim 1, wherein the interface transfer module performing the bus transfer comprises: the interface transfer module converts a bus data format of the non-voice service data adapted to the 3G communication module into a bus data format of the non-voice service data adapted to the AP, and/or converts a bus data format of the non-voice service data adapted to the AP into a bus data format of the non-voice service data adapted to the 3G communication module.

3. The device according to claim 2, wherein the interface transfer module is a Field-Programmable Gate Array (FPGA), wherein the FPGA is connected with the 3G communication module through an parallel asynchronous ADM bus and connected with the AP through a Serial Peripheral Interface (SPI) bus.

4. The device according to claim 3, wherein the FPGA:
   caches in a cache pool non-voice service data that the 3G communication module writes through the ADM bus, so that the non-voice service data is read by the AP through the SPI bus; or,
   caches in a cache pool non-voice service data that the AP writes through the SPI bus, so that the non-voice service data is read by the 3G communication module through the ADM bus.

5. The device according to claim 4, wherein
   the 3G communication module has two wakeup interfaces (GPIO1 and GPIO2) connected with the AP and configured to write the non-voice service data of the 3G communication module into the AP, wherein when one wakeup interface (GPIO1) is set at high electric level, the non-voice service data of the 3G communication module is written into the cache pool of the FPGA, and when the other wakeup interface (GPIO2) is set at high electric level, the AP is notified to read the non-voice service data of the 3G communication module from the cache pool of the FPGA; and
   the AP has two wakeup interfaces (GPIO3 and GPIO4) connected with the 3G communication module and configured to write the non-voice service data of the AP into the 3G communication module, wherein when one wakeup interface (GPIO3) is set at high electric level, the non-voice service data of the AP is written into the cache pool of the FPGA, and when the other wakeup interface (GPIO4) is set at high electric level, the 3G communication module is notified to read the non-voice service data of the AP from the cache pool of the FPGA.

6. The device according to claim 1, wherein the interface transfer module is a Field-Programmable Gate Array (FPGA), wherein the FPGA is connected with the 3G communication module through an parallel asynchronous ADM bus and connected with the AP through a Serial Peripheral Interface (SPI) bus.

7. The device according to claim 6, wherein the FPGA:
   caches in a cache pool non-voice service data that the 3G communication module writes through the ADM bus, so that the non-voice service data is read by the AP through the SPI bus; or,
   caches in a cache pool non-voice service data that the AP writes through the SPI bus, so that the non-voice service data is read by the 3G communication module through the ADM bus.

8. The device according to claim 7, wherein
   the 3G communication module has two wakeup interfaces (GPIO1 and GPIO2) connected with the AP and configured to write the non-voice service data of the 3G communication module into the AP, wherein when one wakeup interface (GPIO1) is set at high electric level, the non-voice service data of the 3G communication module is written into the cache pool of the FPGA, and when the other wakeup interface (GPIO2) is set at high electric level, the AP is notified to read the non-voice service data of the 3G communication module from the cache pool of the FPGA; and the AP has two wakeup interfaces (GPIO3 and GPIO4) connected with the 3G communication module and configured to write the non-voice service data of the AP into the 3G communication module, wherein when one wakeup interface (GPIO3) is set at high electric level, the non-voice service data of the AP is written into the cache pool of the FPGA, and when the other wakeup interface (GPIO4) is set at high electric level, the 3G communication module is notified to read the non-voice service data of the AP from the cache pool of the FPGA.

9. A method for connecting a 3G communication module and an application processor (AP), used for writing and reading voice service data and non-voice service data of the 3G communication module and the AP, and comprising steps of:
an interface transfer module connected between the 3G communication module and the AP performing bus transfer on a bus interface of the 3G communication module used for transmitting non-voice service data and a bus interface of the AP used for transmitting non-voice service data; and
the voice service data of the 3G communication module or the AP being transmitted through a bus directly connecting the 3G communication module and the AP.

10. The method according to claim 9, wherein the interface transfer module performing the bus transfer comprises the interface transfer module converts a bus data format of the non-voice service data adapted to the 3G communication module into a bus data format of the non-voice service data adapted to the AP, and/or converts a bus data format of the non-voice service data adapted to the AP into a bus data format of the non-voice service data adapted to the 3G communication module.

11. The method according to claim 10, wherein the interface transfer module is an FPGA, wherein the FPGA is connected with the 3G communication module through an ADM bus and connected with the AP through an SPI bus.

12. The method according to claim 11, wherein writing and reading of the non-voice service data comprise:
the FPGA caching in a cache pool non-voice service data that the 3G communication module writes through the ADM bus, so that the non-voice service data is read by the AP through the SPI bus; or
caching in a cache pool non-voice service data that the AP writes through the SPI bus, so that the non-voice service data is read by the 3G communication module through the ADM bus.

13. The method according to claim 12, wherein writing and reading of the non-voice service data comprise:
the 3G communication module having two wakeup interfaces (GPIO1 and GPIO2) connected with the AP and configured to write the non-voice service data of the 3G communication module into the AP, wherein when one wakeup interface (GPIO1) is set at high electric level, the non-voice service data of the 3G communication module is written into the cache pool of the FPGA, and when the other wakeup interface (GPIO2) is set at high electric level, the AP is notified to read the non-voice service data of the 3G communication module from the cache pool of the FPGA; and
the AP having two wakeup interfaces (GPIO3 and GPIO4) connected with the 3G communication module and configured to write the non-voice service data of the AP into the 3G communication module, wherein when one wakeup interface (GPIO3) is set at high electric level, the non-voice service data of the AP is written into the cache pool of the FPGA, and when the other wakeup interface (GPIO4) is set at high electric level, the 3G communication module is notified to read the non-voice service data of the AP from the cache pool of the FPGA.

14. The method according to claim 9, wherein the interface transfer module is an FPGA, wherein the FPGA is connected with the 3G communication module through an ADM bus and connected with the AP through an SPI bus.

15. The method according to claim 14, wherein writing and reading of the non-voice service data comprise:
the FPGA caching in a cache pool non-voice service data that the 3G communication module writes through the ADM bus, so that the non-voice service data is read by the AP through the SPI bus; or
caching in a cache pool non-voice service data that the AP writes through the SPI bus, so that the non-voice service data is read by the 3G communication module through the ADM bus.

16. The method according to claim 15, wherein writing and reading of the non-voice service data comprise:
the 3G communication module having two wakeup interfaces (GPIO1 and GPIO2) connected with the AP and configured to write the non-voice service data of the 3G communication module into the AP, wherein when one wakeup interface (GPIO1) is set at high electric level, the non-voice service data of the 3G communication module is written into the cache pool of the FPGA, and when the other wakeup interface (GPIO2) is set at high electric level, the AP is notified to read the non-voice service data of the 3G communication module from the cache pool of the FPGA; and
the AP having two wakeup interfaces (GPIO3 and GPIO4) connected with the 3G communication module and configured to write the non-voice service data of the AP into the 3G communication module, wherein when one wakeup interface (GPIO3) is set at high electric level, the non-voice service data of the AP is written into the cache pool of the FPGA, and when the other wakeup interface (GPIO4) is set at high electric level, the 3G communication module is notified to read the non-voice service data of the AP from the cache pool of the FPGA.

* * * * *